3,773,753
PROCESS FOR PRODUCTION OF ALGINATES
Gerald D. Wright and John P. Arendt, San Diego, Calif., assignors to Kelco Company, San Diego, Calif.
Filed Jan. 10, 1972, Ser. No. 216,369
Int. Cl. C08b 19/10
U.S. Cl. 260—209.6    8 Claims

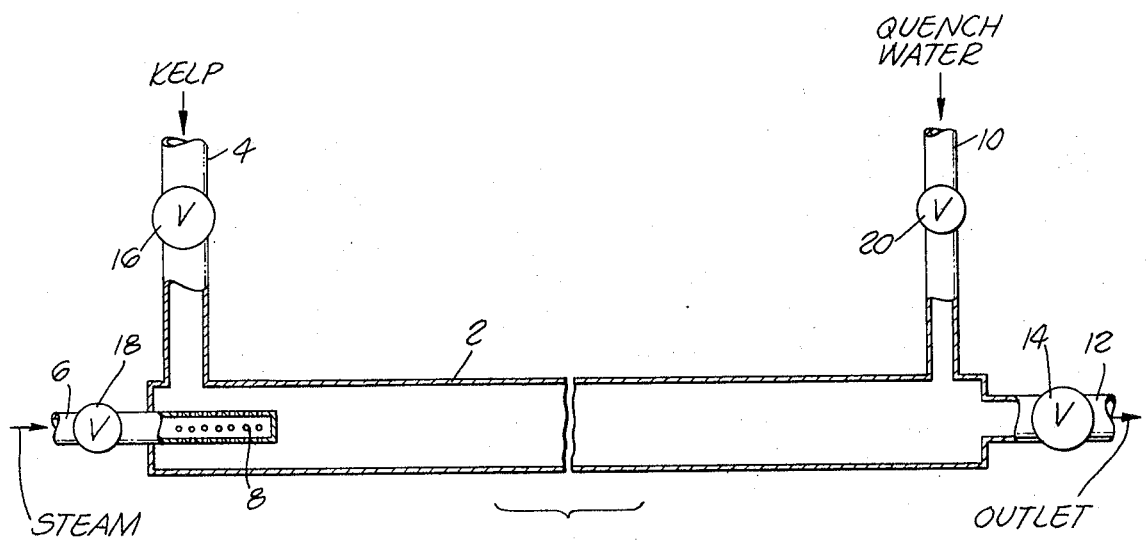

ABSTRACT OF THE DISCLOSURE

An improved extraction procedure for removing alginic acid from kelp. The kelp in a comminuted form in admixture with water is passed through an extractor under conditions which approximate plug flow. The comminuted kelp is introduced to the extractor in admixture with sodium carbonate and water where it is then immediately heated to a temperature of about 190 to about 270° F. by pressurized steam. The residence time of the materials within the extractor ranges from about 10 to about 40 minutes. By providing conditions which produce essentially plug flow within the extractor, all of the material passing through the extractor is subjected to substantially the same conditions to produce on a continuous basis a product having generally uniform characteristics.

---

This invention pertains to a new procedure for the extraction of alginates from kelp.

The general procedure which is used in manufacturing alginic acid and alginates is set forth in U.S. Patent No. 1,814,981. As there described, the alginic acid and alginates are obtained from the treatment of marine plants or algae which contain alginic acid compounds. Such plants are seaweeds which are found in abundance in certain locations along the coast. Seaweeds which have been used for the production of alginates include marine plants that belong to the general class Phaeophyceae which include the Laminariae such as *Laminaria digitata, Laminaria saccharina, Laminaria cloustoni, Laminaria hyperborea* and *Laminaria pallida*. Especially useful for this purpose are the giant kelps found in the Pacific Ocean such as *Macrocystis pyrifera, Macrocystis integrefolia* and *Nereocystis leutkeana*. All of these plants may be referred to by the common name of "kelp" in terms of describing the process of the present invention.

The average alginic acid content of the marine algae which is preferably employed in the performance of the present invention is about 4% by weight of the leached freshly harvested kelp. The raw kelp must first be harvested. This operation involves underwater cutting of the kelp after which it is brought to a converting plant in a harvesting boat. Raw kelp is then transferred from the harvesting boat to preleaching tanks. Within these tanks, the kelp is subjected to treatment with leach liquors, as will be described subsequently. This leaching operation is carried out under ordinary temperatures to remove most of the adherent salts and absorbed salt solutions derived from the sea water in which the kelp grew.

After the pre-leaching step, the kelp is transferred to leaching tanks in which it is treated in successive treatments with warm water having a temperature of approximately 140° F. The leach liquors obtained from these leaching steps are used in the pre-leaching step where the kelp is treated to remove adherent salts, absorbed salt solutions, etc. After the successive leach treatments, the kelp is drained from the leaching liquors and then chopped up to an average particle size of about 10–20 mesh per inch (Tyler Standard Screen Series) with a solids content of about 5% to about 8% by weight. The kelp is then admixed with water with a weight ratio of kelp (as is basis) to water ranging from about 1:2 to about 2:1. The water content of the kelp on an as is basis is about 94% to about 99%. Thus, the weight ratio of dry kelp to water (including any water introduced with the alkali or sodium carbonate, as will be described) is about 1:100 to about 6:100.

Following this, the kelp is introduced into a high temperature extractor as illustrated in the enclosed drawing. A mixture of comminuted kelp and water is introduced into the extractor 2 through a pipe 4. Prior to the introduction of the kelp stream into the extractor, it is admixed with a sufficient quantity of sodium carbonate, which may itself be admixed with water, to provide a sodium carbonate content of about 0.25% to about 2.0% by weight with respect to the total resulting water in the kelp feed stream. The weight ratio of sodium carbonate to kelp (on a dry kelp basis) in the feed materials entering through pipe 4 will range from about 1:4 to about 1:2. The rate of introduction of the kelp feed stream through pipe 4 may be controlled by a valve 16.

After introduction of the kelp feed stream through the pipe 4 the kelp feed stream is contacted with steam which is introduced into the extractor through a pipe 6. The rate of introduction of the steam may be controlled with a valve 18. The entering steam is under a pressure of about 80 to about 120 p.s.i.g. and preferably about 100 p.s.i.g. This provides an entering steam temperature of about 320–350° F. The inner end of the steam inlet pipe 6 may be capped and may contain a number of holes 8 to provide for an even discharge of the steam into the extractor.

The finely divided kelp and sodium carbonate is heated quickly by the steam to a temperature of about 190° F. to about 270° F. In the function of our process, it is necessary that the kelp undergo a sufficient degree of extraction within a relatively short distance such as about 6 inches to about 2 feet for an extractor having an internal diameter of about 1 to about 24 inches to produce a mixture of materials within the extractor pipe 2 whose viscosity is plastic or pseudoplastic. By a plastic or pseudoplastic viscosity, we refer to an apparent viscosity of the materials which varies inversely with respect to shear— i.e., as the applied shear is increased the apparent viscosity is decreased and as the applied shear is decreased the apparent viscosity is increased. In determining the viscosity characteristics of a material, its apparent viscosity (AV) may be measured in centipoises at a shear rate of 1022 reciprocal seconds. The viscosity of the material may then be measured in centipoises at 511 reciprocal seconds and the plastic viscosity (PV) in centipoises is equal to twice the apparent viscosity (AV) minus the viscosity measured at a shear rate of 511 reciprocal seconds. For Newtonian fluids, the plastic viscosity and the apparent viscosity are the same. However, for plastic or pseudoplastic materials, the plastic viscosity is less than the apparent viscosity.

The plastic or pseudoplastic viscosity characteristics of the material flowing through the pipe 2, which is necessary for plug flow, results from the presence of sodium alginate and sodium alginate salts. These materials act to thicken the water passing through the extractor 2 to provide a plastic or pseudoplastic viscosity for the mixture of materials flowing through the extractor.

Referring again to the drawing, the mixture of materials passing through the extractor 2 may be contacted with cooling water introduced through a pipe 10 immediately adjacent to the exit from the extractor. The flow rate of cooling water may be adjusted by a valve 20. The amount of cooling water and its temperature may be controlled to produce an immediate cooling of the mixture of materials within the extractor to a temperature of about 210° F. or less. The extracted material and cooling water is then discharged from the extractor through a pipe 12 containing a valve 14. The valve 14 may be used to control the flow rate of materials through the extractor.

As described, our process provides a means for extracting alginic acid from kelp in a much shorter time than that previously required.

In utilizing our process for extracting alginic acid from kelp, the residence time of the materials within the extractor is about 10 to about 40 minutes depending upon the desired properties of the alginate product. In tests which we have conducted, the extractor 2 was a pipe having an internal diameter of eight inches and a length of 400 feet. In order to save space within the confines of a plant, the extractor can be made in the form of a pipe having 180° bends. To maintain essentially plug flow within the reactor, the radius of the 180° bends should be standard long radius elbows so as to not cause turbulence when the mixture of materials flows around the bends.

The temperature within the extractor is maintained at a temperature of about 190° F. to about 270° F. This provides a temperature which is adequate for the extraction within the desired residence time, while at the same time, not being so high as to produce carmelization of the sugars within the comminuted kelp. At temperatures of about 300° F. or greater, the sugars within the kelp are carmelized, which produces an off color in the resulting product. Also, the pH within the extractor should be maintained at about 9.5 or higher in order to extract the alginic acid in the form of its alkali metal salt. When sodium carbonate is used in the extraction, the alginic acid is obtained as sodium alginate. Other carbonate salts such as potassium carbonate or magnesium carbonate may also be used for the extraction as well as the bases sodium hydroxide or potassium hydroxide. The alkali salt of alginic acid obtained from the extraction will correspond to the alkali used in the extraction, e.g., potassium alginate from potassium carbonate or potassium hydroxide, and magnesium alginate from magnesium carbonate.

In tests which were conducted utilizing our process, the extractor was operated at temperatures of 190° F. to 250° F. The material discharged from the extractor through pipe 12 was filtered and calcium chloride was added to the filtrate to precipitate the alginate product as calcium alginate. The calcium alginate was then converted to alginic acid by the addition thereto of hydrochloric acid.

In an alternate procedure, hydrochloric acid may be added directly to the filtrate to convert the sodium alginate to insoluble alginic acid.

Using either of the above procedures, the resultant alginic acid may be dried to a constant weight to determine the solids content and a stoichiometric quantity of ammonium hydroxide may be added to convert the alginic acid to ammonium alginate. To obtain an ammonium alginate solution of a given concentration, e.g., 1% by weight, dried alginic acid may be added to distilled water in an amount to provide a 1% by weight solution. Then, the proper amount of ammonium hydroxide may be added to stoichiometrically convert the alginic acid to ammonium alginate. A small amount of sodium hexametaphosphate is then added to sequester any calcium that is present so that it will not affect the viscosity through reaction with the alginate. Following this, the viscosity may then be measured at a temperature of about 25° C. using a Brookfield Synchroelectric Viscometer, Model LVF, at 60 r.p.m., using the appropriate spindle. When the viscosity of the products from our extraction process were measured in the above manner, it was found that the 1% by weight viscosity of the product was relatively uniform for a given extractor operating temperature. The degree of polymerization (D.P.) of the product was also relatively uniform with a relatively narrow distribution range between the shortest chain length and the longest chain length in the product.

The D.P. of the alginate product is dependent upon the operating temperature of the extractor 2. When the temperature was raised, e.g., to 250° F., the D.P. of the product was lowered and a lower viscosity product was produced. When the operating temperature of the extractor 2 was reduced to a lower temperature, e.g., 230° F., the D.P. of the product increased and the product had an intermediate viscosity. When the operating temperature of the extractor was reduced still further to a temperature of 215° F., the D.P. of the resulting product was increased and a relatively high viscosity product was produced.

Our process, as described above, produces sodium alginate products of relatively uniform quality in a manner which was heretofore found impossible. The time required for the extraction utilizing our process is considerably less than the time previously required. Moreover, the resulting products are of a higher quality, i.e., having more uniform viscosity characteristics, than sodium alginate produced by extraction within an extractor tank as utilized by the prior art. In extracting sodium alginate within an extractor tank, it is difficult to maintain a complete uniformity of conditions throughout the tank since, due to its size and configuration, the temperature conditions will vary from one point in the tank to another. However, in our process, all of the material passing through the extractor is subjected to substantially the same conditions. This results from the fact that the material passing through the extractor undergoes essentially plug flow. Thus, the velocity at which the materials are passing through the extractor is relatively uniform throughout the cross-section of the extractor. The apparent viscosity of the mixture of materials within the extractor, when measured in the manner described previously, will range from about 1,000 to about 100,000 cps. However, due to the pseudoplastic or plastic viscosity characteristics of the material within the extractor, the liquid film in contact with the inside diameter of the extractor pipe 2 will slip easily along the wall of the pipe. The net result is that the relatively viscous mixture passing through the extractor produces a negligible friction through contact with the interior of the extractor.

Following the removal of the reaction mixture from the extractor 2, it may be treated in the manner described in the Thornley et al. patent, U.S. 1,814,981, to remove any cellular debris and other undissolved matter. This is accomplished by passing the materials from the extractor through a filter such as a bag filter or a rotary suction filter of the type known as "Oliver" filters. During filtration, a small amount of a filter aid, such as a diatomaceous earth, may be added.

Following filtration, the sodium alginate may, if desired, be reacted with a calcium salt in a known manner to produce a fibrous form of insoluble alginate.

A further advantage in our process is its simplicity in terms of carrying out the extraction of alginic acid from kelp on a continuous basis. When the flow rates of the various materials through the extractor have been established, in the manner described previously, to achieve substantially plug flow, the extraction does not require the presence of operators, as previously required, for charging and discharging materials from a batch type of extraction unit. Further, due to its simplicity, the equipment required for our process requires very little maintenance and the capital requirement for the equipment used in our process is considerably less than the capital requirement for batch extraction units. Since our process utilizes a closed system, it is also much easier to maintain sterile conditions and to avoid bacterial degradation.

In a broader sense, our process has application to a wide variety of treatments other than the extraction of alginic acid from kelp. By way of example, our process may be employed in the cooking or high temperature treatment of food products, such as fruits and vegetables. In this application, the fruit or vegetable would be fed into the extractor 2 through the pipe 4 in admixture with sodium alginate or any other water soluble thickener in an amount sufficient to provide substantially plug flow conditions within the extractor 2. The choice of the particular thickener would be determined by its temperature stability under the conditions employed within the extractor. Heat, in the form of steam, would then be supplied through pipe 6 so as to heat the food mixture to whatever temperature was required in the cooking or heat treatment operation. In the utilization of our process for the heat treatment of food products, it is not necessary that the heat be produced by means of direct steam injection. Rather, the heat may be produced by means of a heating media surrounding the extractor 2, as, for example, in the case of a heat exchanger or heat supplied to the interior of the extractor 2 by a hollow heat screw or helical conveyor. Following the cooking or heat treatment within the extractor, the cooked food mixture may then be discharged through the outlet pipe 12. In the use of our process for the treatment of foods, there would generally be no need for the introduction of quench water. Thus, the inlet pipe 10 could be eliminated from the extractor.

Examples of thickeners which may be employed in our process when used as a cooking or heat treatment process are locust bean gum, Xanthan gum, guar gum, carrageenan, and the like. Also, synthetic thickeners such as carboxymethyl cellulose may be employed, or any of the biosynthetic gums.

All of the above thickeners are not equally temperature stable. Thus, the choice of a particular thickener is governed by its cost and the temperature conditions imposed within the extractor 2 or, in this case, the heating unit.

By utilizing our procedure in the treatment of foods, the food materials are subjected to a more uniform heat treatment since the residence time within the heater is substantially uniform. In the heat treatment of food products utilizing procedures of the prior art, the heat treatment is not generally uniform. For example, in the treatment of food products in a large container, the food product adjacent the heated surface, i.e., the exterior of the container, is generally heated to a much greater degee than the material at the interior of the container. This can result in overprocessing of a portion of the good product in order to insure that the material in the interior of the container is adequately processed. By overprocessing or overheating a portion of the food product, degradation can result. Also, as a result of non-uniform heat treatment, the resulting food product will have non-uniform characteristics which are undesirable.

Since our process utilizes a closed system, its use in the processing of foods is desirable since the likelihood of any bacterial contamination would be considerably lessened. Bacterial contamination is a constant problem in the heat processing of foods and our process offers considerable advantages over previous procedures in this regard. In addition, our process has all of the advantages previously enumerated, i.e., less capital expenditure, less maintenance, and less operating personnel, as compared with previous food processing procedures.

What is claimed is:

1. A process for continuously extracting alginic acid from kelp, said process comprising introducing a mixture of comminuted kelp and water into a tubular extraction zone, said mixture containing an alkali in an amount sufficient to provide a pH of about 9.5 or higher within said extraction zone, contacting said mixture with steam at a pressure of about 80 to about 120 p.s.i.g., the steam rate being sufficient to quickly heat said mixture to a temperature of about 190 to about 270° F. to extract a sufficient quantity of alginic acid from said kelp to provide said mixture with viscosity characteristics which are plastic or pseudoplastic and to establish essentially plug flow of said mixture within said extractor, and removing said mixture from said tubular extraction zone.

2. The process of claim 1 wherein said mixture is contacted with cooling water before its removal from said extraction zone to reduce the temperature of said mixture to about 210° F. or less.

3. The process of claim 1 wherein said tubular extraction zone has an internal diameter ranging from about 1 to 24 inches.

4. The process of claim 1 wherein said alkali is sodium carbonate with the weight ratio of sodium carbonate to kelp on a dry basis ranging from about 1:4 to about 1:2.

5. The process of claim 1 wherein the residence time of said mixture within said extractor ranges from about 10 to about 40 minutes.

6. The process of claim 1 wherein said comminuted kelp has an average particle size of about 10 to 20 mesh.

7. The process of claim 1 wherein the weight ratio of kelp on a dry basis with respect to the water in the kelp-water mixture being fed to said extractor ranges from about 1:100 to about 6:100.

8. In the process for continuously processing through a closed system including a substantially tubular heating zone a mixture of water and fruit or water and vegetable, the improvement which consists essentially of adding a water soluble organic thickener to said mixture, prior to the entry of said mixture into said heating zone, in an amount sufficient to provide plastic or pseudoplastic flow characteristics thereto whereby such thickened mixture flows in contact with the internal surface of said heating zone and passes through said heating zone under conditions of plug flow, thereby obtaining substantially uniform heating of said plug flowing thickened mixture.

References Cited

UNITED STATES PATENTS

| | | | |
|---|---|---|---|
| 2,122,982 | 7/1938 | Leo | 99—132 |
| 2,185,064 | 12/1939 | Reich | 99—132 |
| 2,563,996 | 8/1951 | Edgar et al. | 99—131 |
| 3,374,096 | 3/1968 | Knoch | 99—131 |
| 3,219,483 | 11/1965 | Goos et al. | 23—252 R |
| 1,814,981 | 7/1931 | Thornley et al. | 260—209.6 |
| 2,375,730 | 5/1945 | Caldwell et al. | 23—271 |
| 2,477,861 | 8/1949 | Clark et al. | 260—209.6 |
| 2,645,463 | 7/1953 | Stearns | 259—4 |
| 2,742,423 | 4/1956 | Saddington et al. | 260—209.6 |
| 3,335,655 | 8/1967 | McCuiston | 259—4 |
| 3,423,397 | 1/1969 | Husaini | 260—209.6 |
| 3,450,022 | 6/1969 | Engel | 259—4 |

DONALD E. CZAJA, Primary Examiner

R. W. GRIFFIN, Assistant Examiner

U.S. Cl. X.R.

99—129, 132